(12) United States Patent
Salminen et al.

(10) Patent No.: US 7,721,084 B2
(45) Date of Patent: May 18, 2010

(54) FIREWALL FOR FILTERING TUNNELED DATA PACKETS

(75) Inventors: Riku Salminen, Turku (FI); Tuomo Syvänne, Vantaa (FI); Mika Jalava, Siuntio (FI)

(73) Assignee: Stonesoft Corporation, Helsinki (FI)

( * ) Notice: Subject to any disclaimer, the term of this patent is extended or adjusted under 35 U.S.C. 154(b) by 735 days.

(21) Appl. No.: 10/301,857

(22) Filed: Nov. 22, 2002

(65) Prior Publication Data

US 2003/0115328 A1 Jun. 19, 2003

(30) Foreign Application Priority Data

Nov. 29, 2001 (FI) .................................. 20012338

(51) Int. Cl.
  *H04L 29/06* (2006.01)
(52) U.S. Cl. ...................................... 713/150; 713/160
(58) Field of Classification Search ................. 709/225; 713/150

See application file for complete search history.

(56) References Cited

U.S. PATENT DOCUMENTS

| 5,444,782 | A | * | 8/1995 | Adams et al. ................ 713/153 |
| 5,602,920 | A | * | 2/1997 | Bestler et al. ............... 380/212 |
| 5,898,784 | A | | 4/1999 | Kirby et al. |
| 6,178,505 | B1 | | 1/2001 | Schneider et al. |
| 6,738,909 | B1 | * | 5/2004 | Cheng et al. ................... 726/3 |
| 7,139,792 | B1 | * | 11/2006 | Mishra et al. ............... 709/203 |
| 2002/0038419 | A1 | * | 3/2002 | Garrett et al. ............... 713/154 |
| 2002/0068584 | A1 | * | 6/2002 | Gage et al. ................... 455/456 |
| 2002/0163920 | A1 | * | 11/2002 | Walker et al. ............... 370/401 |
| 2003/0115328 | A1 | * | 6/2003 | Salminen et al. ............ 709/225 |

OTHER PUBLICATIONS

Braun et al., "Secure Mobile IP Communication," Institute of Computer Science and Applied Mathematics, University of Bern, Oct. 14, 2002, 8 pp.
Montenegro G et al. "Sun's SKIP Firewall Traversal for Mobile IP" Internet Citation [Online] Jun. 1998 URL: hhtp://www.ietf.org/rfc/rfc2356.txt.

* cited by examiner

*Primary Examiner*—Kambiz Zand
*Assistant Examiner*—Jason K Gee
(74) *Attorney, Agent, or Firm*—Barnes & Thornburg LLP

(57) ABSTRACT

A method of filtering a tunneled data packet including an outer header and an outer payload, the outer payload including an inner data packet including an inner header and an inner payload, where the value of at least one outer header field of the tunneled data packet is matched to a first rule, and the action defined in the first rule is taken. Taking the action defined in the first rule includes detecting the inner data packet within the tunneled data packet, matching the value of at least one field of the inner data packet to a second rule, and taking the action defined in the second rule.

16 Claims, 6 Drawing Sheets

| RULE # | SRC ADDR | DST ADDR | SERVICE | ACTION |
|---|---|---|---|---|
| 1 | any | 172.16.1.10 | http | allow |
| 2 | any | any | http | deny |
| 3 | 10.1.1.0 | 192.168.1.1 | ftp | allow |
| 4 | 10.1.1.0 | any | telnet | allow |
| 5 | any | any | any | deny |

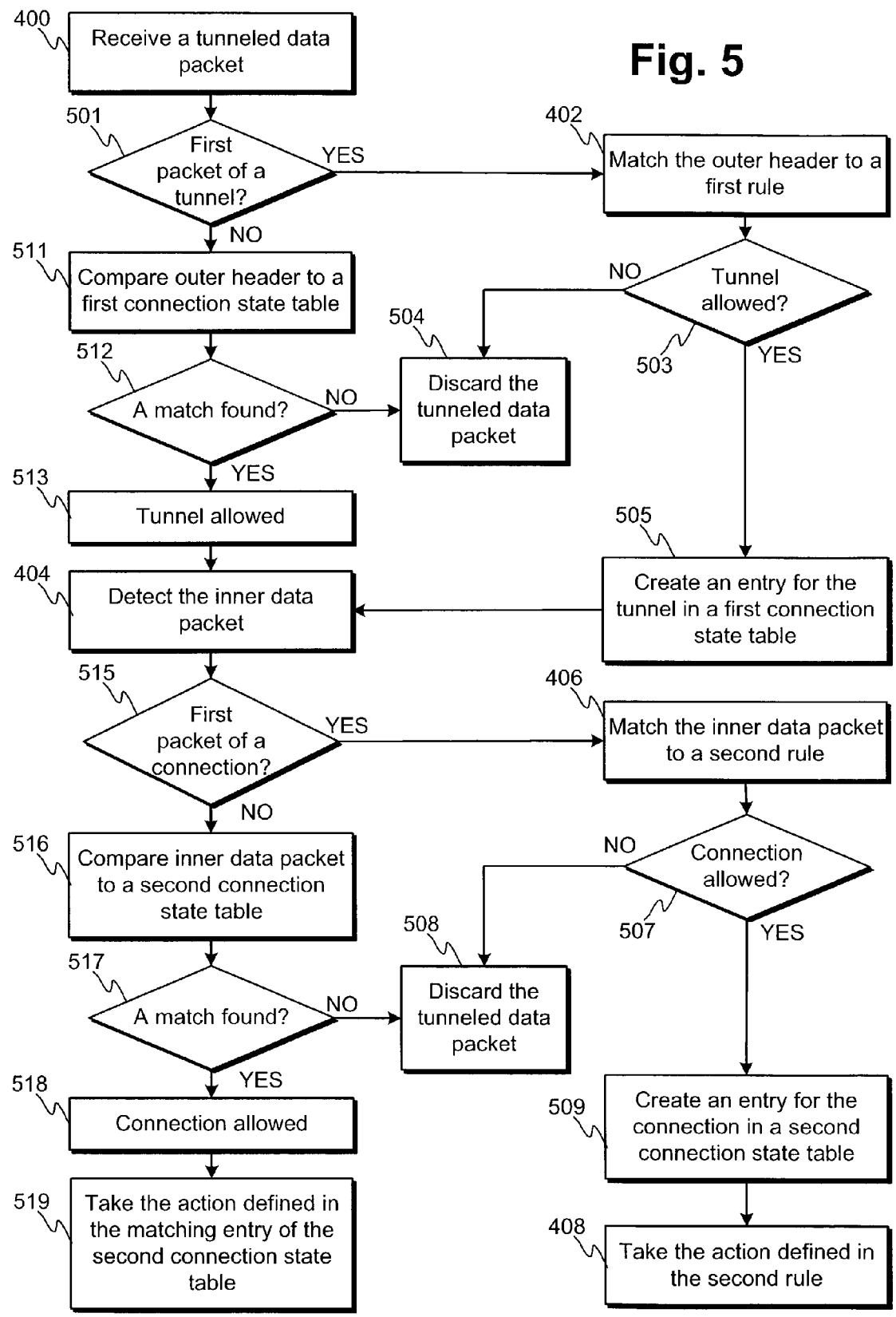

FIREWALL FOR FILTERING TUNNELED DATA PACKETS

FIELD OF THE INVENTION

The present invention relates to network security and, more particularly, to firewalls or security gateways.

BACKGROUND OF THE INVENTION

Typically, various organizations protect their internal networks by means of a firewall, which connects the internal network of the organization to public networks and filters and selectively discards the data packets entering and exiting the internal network according to predefined rules. Thus, a firewall is a gateway which operates at the same time as a connector and a separator between the networks in a sense that the firewall keeps track of the traffic that passes through it from one network to another and restricts connections and packets that are defined as unwanted by the administrator of the system. Physically a firewall is a machine with appropriate software to do the tasks assigned to it. It can be a router, a personal computer (PC), or whatever that can be used for such purposes.

Frequently, the filtering rules of a firewall are expressed as a table or list (rule base) of rules comprising data packet characteristics and related actions. Data packet characteristics are parameter values that are obtained from header field of a data packet and may be e.g. source IP (Internet Protocol) address, destination IP address and service (or protocol) or some other values. The action gives information about how to handle a data packet, which corresponds the data packet characteristics defined in the respective rule (i.e. which matches the rule). This means that for a data packet, which has the header information indicated in a rule, the action indicated in the rule is carried out. In a firewall, the action is typically deny or allow, which means the data packet is discarded or allowed to proceed, correspondingly.

The rules of a rule base are examined in certain order until a decision how to process the data packet is reached. The order of the rules in the rule base typically defines the order in which characteristics of a data packet are compared to the rules, that is, the rules are examined one by one from the beginning of the rule base. When a rule, to which the characteristics of a data packet match, is found, the action that is related to that rule is taken and often there is no need to continue examining the rules. However, the action defined in the rule may be continue, in which case examining the rule base is continued from the next rule, or jump, in which case examining the rule base is continued from the rule specified in the jump action. The action of the firewall may be as well reject, which is similar to deny action. The difference is that deny action results in simply discarding the data packet and in reject the sender of the data packet is notified of discarding the data packet.

FIG. 1A illustrates as an example a rule base 10, having 5 rules. In each rule, a rule number, source IP address SRC ADDR, destination IP address DST ADDR, service (or protocol) and action are defined. However, this is only an example structure of rules, and also some other data packet characteristics may be defined in the rules. The rule #1 allows HTTP (Hyper-Text Transfer Protocol) data from any address to a server with IP address 172.16.1.10. All other HTTP traffic is denied with rule #2. That is, if HTTP traffic does not match the rule #1, it is denied. Rules #3 and #4 allow FTP (File Transfer Protocol) traffic from network 10.1.1.0 to FTP server at IP address 192.168.1.15 and Telnet connections from network 10.1.1.10 to any address, respectively. The firewall rule bases are commonly designed to prohibit all that is not expressly permitted in the rules. Therefore, the last rule in the rule base is usually designed to deny any data packet. Rule #5 in the rule base 10 is such rule, that is, it denies data packets of related to any service from any source address to any destination address. So, if a data packet does not match any of the first four rules, it matches this last one and is denied.

In summary, when a data packet is received in the firewall, some of the header field values of the data packet are compared to the rules, which are stored in the firewall, and when a matching rule is found, the action related to the matching rule is taken.

In a stateful firewall, information about connection history is maintained. In general, a data packet opening a connection is compared to the rules in the rule base, and if the data packet is allowed, a state is created for the opened connection. The state is created by making into a connection state table an entry that includes information for identifying the connection (e.g. source and destination address, ports and/or protocol), and the state of the connection. Other than data packets opening a connection are then compared to the connection state table and allowed, if a corresponding entry is found and the data packet is in accordance with the state of the connection. At the same time the state of the connection in the connection state table may be updated. If a corresponding entry is not found in the state table, the data packet may be compared to the rules in the rule base and possibly allowed on the basis of rules or simply discarded. Stateful inspection makes processing of data packets belonging to open connections faster than simple packet filtering on the basis of rules. Additionally, state of the connections (the data packets that have already been allowed and possibly their content) can be taken into account in processing data packets, which makes stateful firewall more secure than simple packet filter. Therefore stateful processing is desirable.

Data packet tunneling is a technique in which a data packet is encapsulated within another data packet. This means, that an additional outer header is attached to the original data packet, and the original data packet including its header(s) is transmitted as payload of the outer data packet. FIG. 1B shows a schematic diagram of a tunneled data packet, that is, of a data packet encapsulated within another data packet. Therein the data packet having an outer header HEADER_tunnel 112 has as its outer payload PAYLOAD_tunnel a data packet consisting of an inner header HEADER_orig 114 and an inner payload PAYLOAD_orig 116. At the end of the tunnel the data packet is decapsulated, that is, the outer header is "pealed off" the data packet and the original data packet is revealed.

Traditionally, the main reasons for using tunneling have been enabling transport of non-IP packets (such as IPX) in IP networks, transporting encrypted data packets and enabling connectivity between networks over a network which does not allow the use of addresses used in the communicating networks. With regard to transferring encrypted data packets, a data packet (including header) may be for example encrypted in a gateway, tunneled to another gateway, which decapsulates the tunneled data packet and decrypts the contents for obtaining the original data packet for delivery to the designated recipient.

Tunneling encrypted data packets is used for example in connection with IPsec (Internet Protocol Security), which is especially useful for implementing virtual private networks (VPN).

Other tunneling mechanisms are for example Point-to-Point Tunneling Protocol (PPTP) and Layer Two Tunneling Protocol (L2TP). PPTP is a protocol (set of communication rules) that allows corporations to extend their own corporate network through private "tunnels" over the public Internet. L2TP is an extension of the PPTP used by an Internet service provider (ISP) to enable the operation of a virtual private network (VPN) over the Internet. Additionally, there are other vendor-specific tunneling solutions.

Traditionally many of the connections within the tunnels (data inside the tunnel) were either encrypted, and therefore not accessible by an intermediate gateway element, or not understood by an IP firewall. Due to these features, firewalls have not been able to or required to filter data packets within tunnels. Instead filtering has been conducted on the tunnel level (on the basis of the headers of the outer data packet).

Mobile IP is a protocol for enabling an entity to change its point of attachment to the Internet without changing the IP address it is using. That is, an entity can use the same IP address even if its location in the network changes. From the network point of view, this means that the path used to deliver the traffic for the entity can change. Mobile IP creates a need for tunneling standard IP packets encapsulated in IP packets. IP-OVER-IP is a protocol for encapsulating IP packets to IP packets and is used for example in mobile IP. In the following some features of mobile IP are presented.

Traditionally, IP address of an entity uniquely identifies the entity's point of attachment to the Internet. Therefore, the entity must be located on the network indicated by its IP address in order to communicate using the IP address. Otherwise, the data packets destined to the entity by using its IP address would not be deliverable.

According to mobile IP, each mobile node (or entity) is always identified by its home IP address, regardless of its current point of attachment to the Internet. When the mobile node (MN) is outside its home network and therefore not directly reachable by its home IP address, a care-of address, which provides information about its current point of attachment to the Internet, is assigned the mobile node in addition to the home IP address. The care-of address may be the IP address of a foreign agent (FA) located in the network the mobile node is visiting or it may be a co-located care-of address, which is an address of the network the mobile node is visiting, which is dynamically assigned to the mobile node (e.g. by means of DHCP, Dynamic Host Configuration Protocol). The mobile node registers the care-of address with a home agent (HA) in its home network by sending a Registration Request message (UDP, User Datagram Protocol, data packet to port 434) to which the home agent responds with a Registration Reply message in IPv4, which is the "current" version of Internet Protocol. In IPv6, which is the next generation of Internet Protocol, the registration is done by means of specific Extension Headers. FIG. 1C shows the fields of an example IPv6 data packet. For example Extension Header 121 can be used for registering the care-of address by means of Binding Update and Binding Acknowledgement Destination Options. When the mobile node is in its home network, it communicates with other entities by using its home IP address normally. When the mobile node is outside its home network, that is, in a foreign network, other entities still reach the mobile node by using its home IP address. After the home agent has been notified that the mobile node is in a foreign network with a Registration Request message/Binding Update Destination Option giving the mobile nodes current care-of address, the home agent intercepts the data packets destined to the mobile node's home IP address. The home agent then encapsulates these data packets to data packets destined to the mobile node's care-of address (tunnels data packets) for delivery to the mobile node. If the care-of address is the address of the foreign agent, the foreign agent is the endpoint of the tunnel and it decapsulates the data packet and delivers the original data packet to the mobile node. Similarly, if the care-of address is a co-located care-of address, the mobile node is the endpoint of the tunnel and it decapsulates the data packet for obtaining the original data packet. The mobile node sends reply packets directly to the other end. In IPv6, the mobile, node sends reply packets by using its care-of address as source address, and attaches its home address to a Home Address Extension Header. In this way the data packets are routed correctly (correct source address) and the other end is able to identify the mobile node by extracting the static home address form the Home Address Extension Header. After this the other end may communicate directly with the mobile node; this is done by using the care-of address of the mobile node as a destination address, but including also mobile node's home address in data packets in a Routing Extension Header.

The methods of mobile IP are deployed also in General Packet Radio Service (GPRS). GPRS Tunneling Protocol (GTP) is the protocol used between GPRS Support Nodes (GSNs) in the UMTS/GPRS backbone network. It includes both the GTP signaling (GTP-C) and data transfer (GTP-U) procedures. In GPRS, special support nodes called Gateway GPRS Support Nodes (GGSN) and Gateway Serving GPRS Support Nodes (SGSN) are deployed. SGSNs provide the direct access point for GPRS phones, subtending from GGSNs that provide the gateway to SGSNs across mobile networks that the user may visit. The GGSN also is the access point for other packet data networks, such as Internet, and therefore enabling communication between "normal" IP networks and GPRS devices. GTP is used to forward packets from GGSN to SGSN to reach a mobile device, dynamically setting up tunnels between GGSN and its home network and allowing the mobile unit to have its home network served beyond the GGSN Internet Gateway.

Thus there is an increasing amount of tunneled data packets containing data packets that can be understood by firewalls. However, with current methods matching a data packet within a tunneled data packets to rules is difficult, since both the outer and the inner header need to be examined and matched. This requires that a separate rule is defined for each possible combination of the outer and inner header. The reason for this is that in general, the aim is to filter the connection inside the tunnel (the inner data packet), but in order to filter the inner data packet also the characteristics of the outer header need to be taken into account. Then again, one connection may be transferred in a plurality of different-tunnels, and therefore a plurality of different combinations needs to be considered in the rules.

In addition the tunnel in which a connection is transferred may change without terminating the connection. In this case, if a stateful firewall has accepted the combination of the tunnel and connection (outer and inner header characteristics) and included it into its connection state table, the firewall inevitably fails the connection after change of the tunnel, since after the change the combination of the outer and inner header has changed.

FIGS. 2A and 2B show two different scenarios of how a firewall has been able to process data packets transferred within a tunnel. In FIG. 2A, firewall 204 connects internal network 200 to public network 202 and conveys data packets between a first entity 206 in the internal network and a second entity 208 in the public network. The data packets from the first entity destined to the second entity are transferred as "normal" data packets though a normal connection 210 from the first entity to the firewall. The firewall intercepts the data packets, filters them and if they are allowed, tunnels them to the second entity through a tunnel 212. The firewall may also encrypt the original data packets before tunneling them. In the other direction, the firewall receives tunneled data packets, decapsulates them and then filters them. Thus, the firewall is filtering the inner data packet and does not need to take care of the outer data packets in the filtering process. This scenario is suitable for VPN for example. But this scenario clearly does not suit for situation where the tunnel starts at some other point than the firewall.

In FIG. 2B, firewall 214 connects the internal network 200 to the public network 202 and conveys data packets between a first entity 216 in the internal network and a second entity 218 in the public network. The data packets from the first entity destined to the second entity are transferred to the firewall in a tunnel 220. The firewall is the endpoint of this tunnel and thus it intercepts the data packets and decapsulates them. After this the firewall filters the data packets and if they are allowed, tunnels them to the second entity through a tunnel 222. That is, the firewall acts as an endpoint of one tunnel and starting point of another. Thus, the firewall is filtering the inner data packet and does not need to take care of the outer data packets in the filtering process. The disadvantage of this method is that it is not transparent to the users. For example, the first entity 216 needs to be aware of the firewall 214 and its IP address in order to be able to create the tunnel 220 to the firewall.

Due to deficiencies described above, a method for transparently filtering connections within a tunnel is needed.

SUMMARY OF THE INVENTION

An object of the invention is to fulfill the need described above by providing a firewall for filtering tunneled data packets and a method used therein.

The objects of the invention are achieved according to the invention as disclosed in the attached independent claims. Preferred embodiments of the invention are disclosed in the dependent claims. The features described in one dependent claim may be further combined with features described in another dependent claim to produce further embodiments of the invention.

The idea of the invention is to filter tunneled data packets in the middle of the tunnel, without the firewall, which is conducting the filtering, having to intervene in constructing the tunnel. The tunnel itself is allowed on the basis of one rule and this rule defines instructions for filtering the inner data packet within the tunneled data packet. In a stateful firewall state information is maintained for both the tunnel(s) and the connection(s) inside the tunnel(s) separately.

That is, a multi-layer technique is used according to the invention. When a tunneled data packet comprising an outer header and an outer payload, the outer payload comprising an inner data packet comprising an inner header and an inner payload, arrives at the firewall, it is detected to be part of a tunnel according to filtering rules, that is, the value of at least one outer header field of the tunneled data packet is matched to a first rule as usual.

This first rule (the action in the rule) indicates that the data packet is part of a tunnel and what type of tunnel is in question (either implicitly or explicitly). Taking the action of the first rule involves detecting the inner data packet, repeating the matching process for the inner data packet, that is, matching the value of at least one field of the inner data packet to a second rule, and taking the action of the second rule. This may be done by means of an external process to which the tunneled data packet is forwarded or by means of information explicitly given in the first rule, the information comprising offset information for finding the beginning of the inner data packet and a pointer to rules to which to match the inner data packet. It must be noted that offset information may not always be static and thus may not be enough for finding the beginning of the inner data packet. This depends on the tunneling protocol used. Handling such protocols is preferably implemented by means of an external process (or program module), which includes functionality for dynamically determining the beginning of the inner data packet.

In the context of this invention a tunneled data packet needs to be interpreted broadly. For example an IPv6 data packet, which includes an Extension Header containing addressing information (e.g. a Home Address Extension Header or Routing Extension Header), needs to be considered as a tunneled data packet. That is, when addressing information is included in an Extension Header, the Extension Header(s) together with the payload can be considered as an inner data packet, while the actual Header without the Extension Header(s) forms the outer header and the Extension Header(s) together with the payload form the outer payload.

The first and the second rule to which the outer header and the inner data packet are matched may be rules of two separate rule bases. Alternatively the second rule may be in a subrule section of the actual rule base of the firewall. One reason for separating the rules to which to match the outer header and the inner data packet is that typically there would be specific rules defined for the connections inside the tunnel and which are not supposed to be used for other data packets. However, the first and the second rule may also be included in one rule base as such. This can be useful especially in cases, where the same rules are used for specific type of connections irrespective of whether they are conveyed in a tunnel or not.

It is possible to include stateful processing in the method according to the invention by creating, on the basis of the outer header, to a first connection state table, an entry (state of a tunnel) for processing other data packets of the same tunnel, the entry comprising a value of at least one outer header field for identifying the other data packets of the same tunnel and instructions for filtering the inner data packet, and creating, on the basis of the inner header, to a second connection state table, an entry (state of an inner connection) for processing other data packets of the same connection, the entry comprising a value of at least one inner header field for identifying the other data packets of the same connection and instructions for processing the inner data packet.

The first and second connection tables may be separate or included in one connection state table. One reason for using separate tables is that the same addressing information may be used in many different internal networks and therefore some connections may be mixed, if all possible entries are included in the same table. Whereas, when some packets of a connection may be tunneled and some not, it is useful to use only one connection state table. In an entry corresponding to the inner data packet there may be included a field for indicating to which tunnel the connection belongs. Another field may be used for indicating whether packets of the connection are allowed, if they are conveyed within some other tunnel, i.e. whether the connection is allowed to change the tunnel. Still another field may be used for indicating whether packets of the connection are allowed, if they are not tunneled, i.e. whether the connection is allowed to traverse the firewall on its own. In this way, a connection is not dropped even though the tunnel, which carries the connection, changes; provided that this is allowed by the firewall administrator.

The instructions in the first connection state table (in the state of the tunnel) for filtering the inner data packet may comprise offset information for finding the beginning of the inner data packet and a pointer to rules and/or to a connection state table to which to match the inner data packet. Alternatively, the instructions may comprise instructions to direct the tunneled data packet to another process for handling, the another process filtering the inner data packet.

The action defined in the second rule to which the inner data packet matches may result for example in discarding the tunneled data packet, allowing it as such or in modifying the tunneled data packet. If the inner data packet is not allowed, the whole tunneled data packet may be discarded or the inner data packet may be cleared. One reason for the latter choice is that in order not to fail the tunnel, all data packets of the tunnel may be required to be sent. Since one tunnel may include many connections, failing the tunnel may not be acceptable. However, selectively clearing some inner data packets enables discarding one or more of the inner connections within the tunnel. Modification of the data packet may involve also changes in the header fields of the inner data packet for example due to network address translation (NAT) requirements.

The solution of the invention does not require that the firewall filtering the tunnel and the connections within it would handle the actual tunneling protocol. Therefore full implementation of the tunneling protocol is not needed in the firewall. The firewall needs to know only some details of the tunneling protocol, in order to find the inner data packet. These details may be embedded into a tunneling protocol specific external process, or program module, to which there is a pointer in a rule or connection state table entry to which the data packets of the tunnel match. Optionally, the firewall may have functionality for identifying negotiations related to establishing a tunnel in order to be able to identify and filter a new tunnel. Since the firewall is not acting as an endpoint of the tunnel, adding a firewall to control the traffic is transparent to the endpoints of the tunnel and therefore does not require any modifications in them.

These and other features of the invention, as well as the advantages offered thereby, are described hereinafter with reference to embodiments illustrated in the accompanying drawings.

BRIEF DESCRIPTION OF THE DRAWINGS

FIGS. 4 and 5 are flow diagrams illustrating operation according to certain aspects of the invention.

PREFERRED EMBODIMENTS OF THE INVENTION

The present invention can be applied in any network gateway or firewall device, which filters data packets traversing it and which encounters filtering tunneled connections. In the following description, a firewall is used as an example of a suitable network gateway.

According to the invention, the endpoints of the tunnels handled in the firewall according to the invention may be any suitable devices, which do not need to be aware of the firewall according to the invention. The data connectivity between the endpoints of the tunnel may be through wireless or fixed line connection.

Figure 3A:
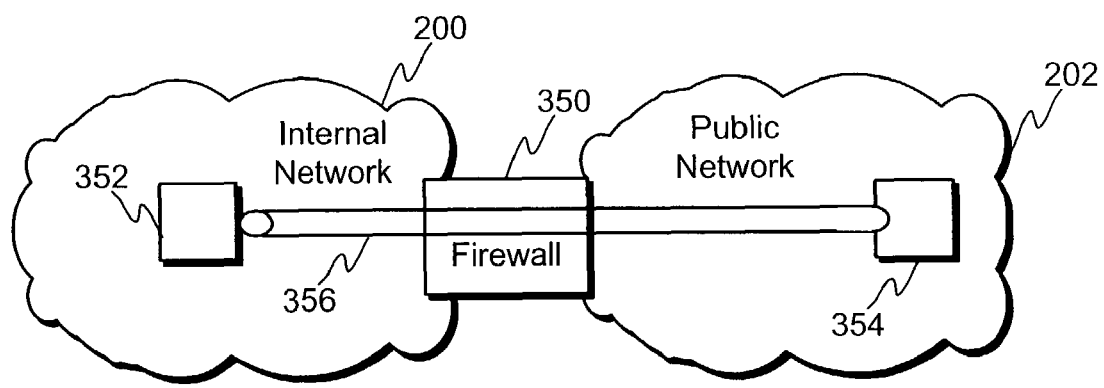
FIGS. 3A and 3B are schematic block diagrams of exemplary network configurations wherein the present invention can be applied.
Figure 3B:
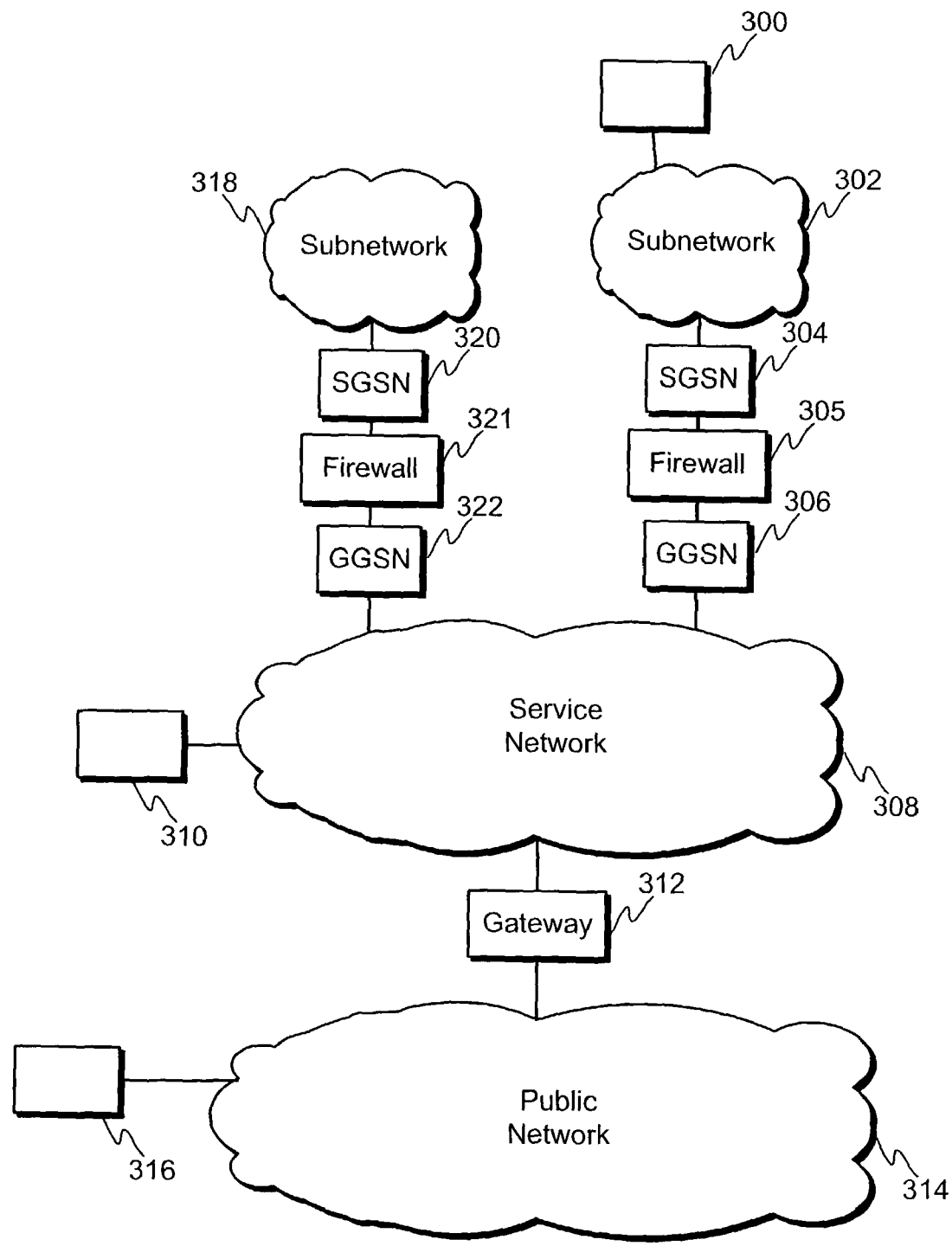

FIGS. 3A and 3B show schematic block diagrams of exemplary network configurations where the invention may be used. The configurations are shown only to facilitate the understanding and description of the present invention. The present invention is not intended to be restricted to any particular network configuration. Further, in order to improve clarity, only network elements which are somehow involved with the present invention are shown in FIGS. 3A and 3B.

Figures 1A, 1B:
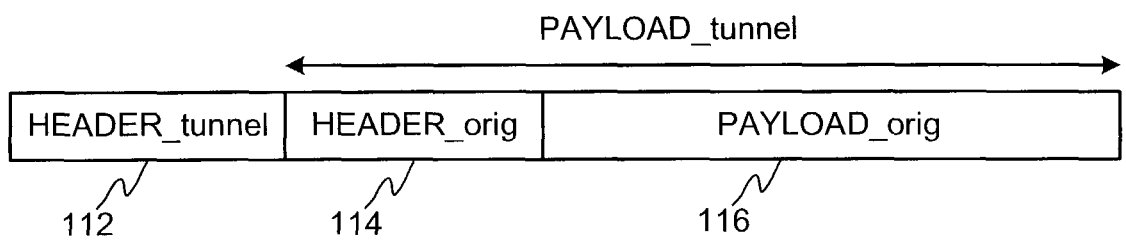
FIG. 1A illustrates an exemplary prior art rule base.
FIG. 1B is an exemplary tunneled packet.
Figure 1C:
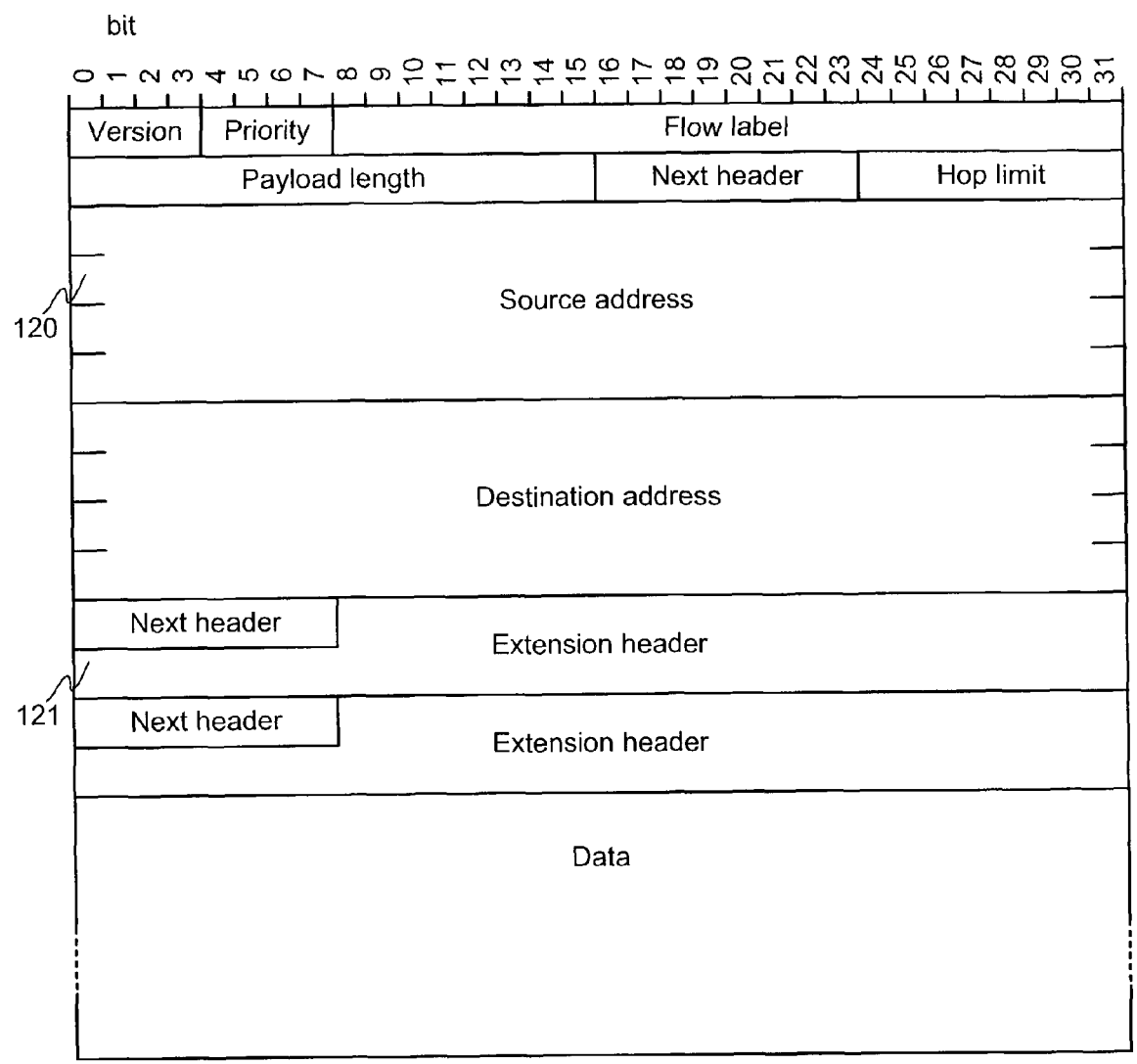
FIG. 1C illustrates the structure of an IPv6 data packet.
Figure 2A:
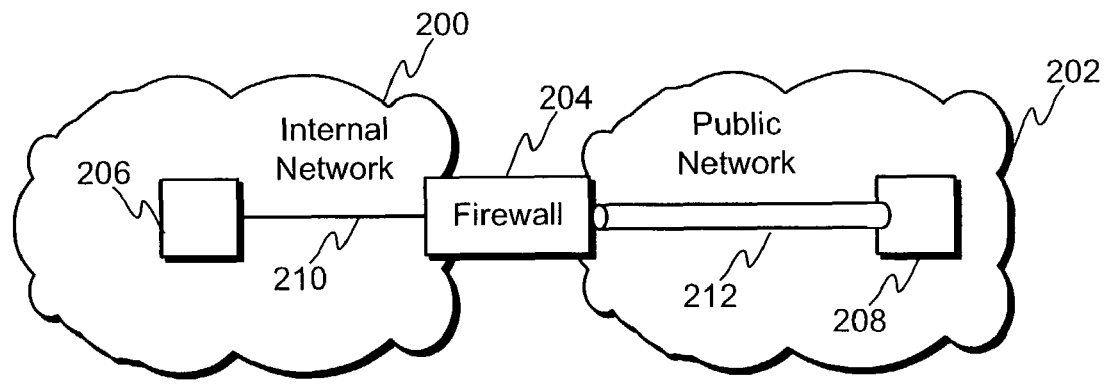
FIGS. 2A and 2B are schematic block diagrams of exemplary network configurations wherein tunneled connections can be applied according to prior art.
Figure 2B:
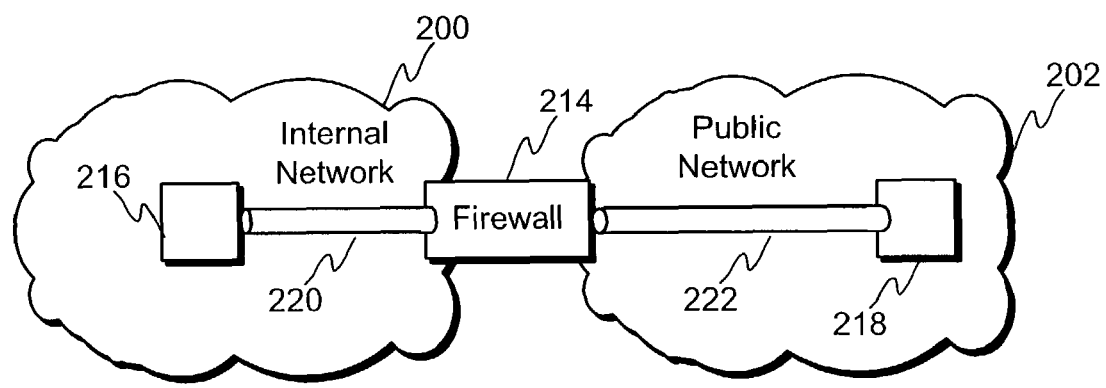

FIG. 3A is similar to FIGS. 2A and 2B, which involve prior art and were discussed above, in order to illustrate the difference between the possibilities offered in prior art and in the invention. In FIG. 3A, a firewall 350 connects internal network 200 to public network 202 and conveys data packets between a first entity 352 in the internal network and a second entity 354 in the public network. The data packets from the first entity destined to the second entity are transferred by means of a tunnel 356. In between the first and second entities, the firewall intercepts the data packets of the tunnel, filters them and if they are allowed, allows the tunneled data packets to proceed to the other end of the tunnel. The firewall does not break the tunnel in any point, and therefore no changes are required in the first and/or the second entity in order to enable the operation of the firewall.

As already described above, the firewall 350 is a gateway which operates at the same time as a connector and a separator between the networks in a sense that the firewall keeps track of the traffic that passes through it from one network to another and restricts connections and packets that are defined as unwanted by the administrator of the system. Physically a firewall is a device with appropriate software to do the tasks assigned to it. It can be a router, a personal computer (PC), or whatever that can be used for such purposes. Furthermore, a firewall may consist of two or more parallel firewall devices, which share the load of the connection between the internal network and the public network and act as backup firewall to each other, in order to provide highly available connectivity. The firewall 350 is managed by means of some management system (not shown in FIG. 3A), which may be remotely or directly connected to the firewall or part of the firewall device. In general, firewall configuration (the rules) is defined in the management system and conveyed to the firewall for execution.

Naturally, the coupling between the internal network 200 and the public network 202 may include also routers and Internet service providers (ISPs not shown in FIG. 3A). As is well known in the art, the internal network 200 may be, for example, a company network, such as a local area network (LAN) or a wireless LAN (WLAN), which connects users and resources, such as workstations, servers, printers and the like of the company. Alternatively, the internal network may consist of connections of individual subscribers such as ADSL subscribers or subscribers of a wireless network such as GSM, GPRS or UMTS network. In this case, the term internal network may not be very descriptive, and instead a term such as a service network could be used.

The present invention relates to filtering data packets (connections) within a tunnel without breaking the tunnel. This is done by matching outer header of a tunneled data packet to a first rule for filtering the tunnel and if the tunnel is allowed, detecting the inner data packet, matching it to a second rule and taking the action defined in the second rule. In other words, the tunnel and the inner data packet are filtered separately according to the invention. The method of the invention is well suited for filtering the data packets within the tunnel in the firewall 350 of FIG. 3A.

FIG. 3B illustrates another schematic block diagram of exemplary network configuration related to GPRS system where the invention may be used. Therein two wireless subnetworks 302 and 318 are connected to a service network 308 via SGSNs 304, 320 and GGSNs 306, 322. SGSNs provide the direct access point for GPRS devices in the subnetworks 302, 318. GGSNs that provide the gateway to SGSNs across mobile networks that the user may visit. The GGSN also is the access point for other packet data networks, such as Internet, and therefore enables communication between "normal" IP networks and GPRS devices. Data is transferred between SGSNs and GGSNs in tunnels according to GTP (GPRS Tunneling Protocol). Between the SGSN 304 and GGSN 306 there is a firewall 305 filtering the GTP tunnel. Accordingly, there is a firewall 321 between the SGSN 320 and the GGSN 322. The service network 308 is further connected to a public network 314 (such as Internet) via a gateway 312, which may or may not be a firewall device.

In sub network 302 there is connected a GPRS device 300, which may communicate with an entity 310 connected to the service network 308 or with an entity 316 connected to the public network 314. These connections go through the firewall 305, wherein the method of the invention may be used in order to filter the connections within the GTP tunnel(s).

Figure 4:
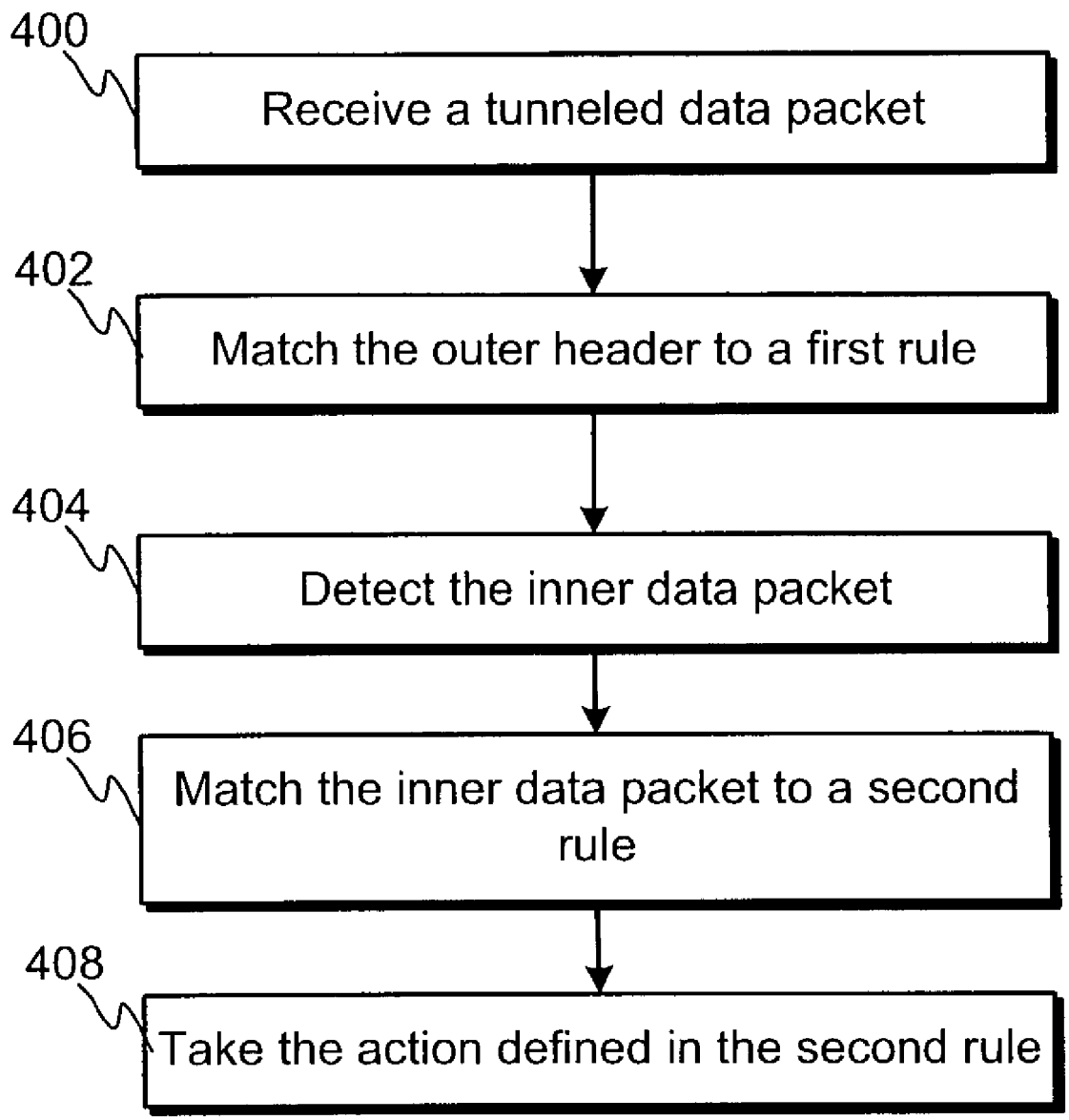

FIG. 4 is a flow diagram illustrating operation of the invention. In step 400, a tunneled data packet comprising an outer header and an outer payload, the outer payload comprising an inner data packet comprising an inner header and an inner payload, arrives at the firewall. In step 402, the value of at least one outer header field of the tunneled data packet is matched to a first rule. Assuming that the first rule allows the tunnel, the inner data packet is detected in step 404. The value of at least one field of the inner data packet is matched to a second rule in step 406 and the action of the second rule is taken in step 408. In other words, the data packet is first detected to be part of a tunnel according to filtering rules. The action in the first rule indicates that the data packet is part of a tunnel and what type of tunnel is in question (either implicitly or explicitly). The action of the first rule may be to discard the data packet, but assuming that the action is allow, taking the action involves also detecting the inner data packet and repeating the matching process for the inner data packet. This may be done by means of an external process to which the tunneled data packet is forwarded or by means of information explicitly given in the first rule, the information comprising offset information for finding the beginning of the inner data packet and a pointer to rules to which to match the inner data packet. It must be noted that offset information may not always be static and thus may not be enough for finding the beginning of the inner data packet. This depends on the tunneling protocol used. Handling such protocols is preferably implemented by means of an external process (or program module), which include functionality for dynamically determining the beginning of the inner data packet.

The first and the second rule to which the outer header and the inner data packet are matched may be rules of two separate rule bases. Alternatively the second rule may be in a subrule section of the actual rule base of the firewall. One reason for separating the rules to which to match the outer header and the inner data packet is that typically, there would be specific rules defined for the connections inside the tunnel and which are not supposed to be used for other data packets. Additionally, other packets may not even match to these rules specified to the data packets inside a tunnel, and therefore comparing other packets to them would be waste of resources.

On the other hand, it is possible that some connections may be conveyed either within a tunnel or on their own. In such case, the first and second rules may be included in one rulebase. That way the same rule can be used for processing a connection irrespective of whether it is tunneled or not.

FIG. 5 is a flow diagram illustrating operation according to certain further aspects of the invention. Herein, stateful processing is included in the method according to the invention. In step 400, a tunneled data packet comprising an outer header and an outer payload, the outer payload comprising an inner data packet comprising an inner header and an inner payload, arrives at the firewall. This step may include detecting whether the data packet that was received is a tunneled data packet or a "normal" data packet. One of the header fields of a data packet usually indicates this (e.g. Next Header field of IPv4 or IPv6, or Extension Header field of IPv6). If the data packet is "normal", the method of invention does not need to be used.

In step 501, it is checked if the tunneled data packet is the first data packet of the tunnel. (Basically, the firewall does not know at this point, if the data packet is a tunneled data packet or any ordinary data packet. Therefore the question is in fact, if the data packet is a first data packet of a connection.) If the data packet is the first data packet of a tunnel, the value of at least one outer header field of the tunneled data packet is matched to a first rule in step 402. Then it is checked if the tunnel (or the data packet) is allowed according to the action of the first rule in step 503. If the packet is not allowed, it is discarded in step 504. If the packet is allowed, an entry corresponding to the tunnel is created in a first connection state table in step 505. Next, the inner data packet is detected in step 404. Detecting the inner data packet is triggered by the action of the first rule as described above.

If the data packet is not the first data packet of a tunnel in step 501, the outer header (at least one field of the outer header) is compared to a first connection state table in step 511 for finding, if the tunnel has been allowed. In step 512, it is checked, if there is an entry matching the outer header in the first connection state table. If there is not, the data packet is discarded in step 504, since the whole tunnel is not allowed in this case. If there is an entry matching the outer header in the first connection state table, the tunnel is allowed, step 513, and the inner data packet of the tunneled data packet is detected in step 404. Detecting the inner data packet is triggered by instructions included in the matching connection state table entry. The instructions in the first connection state table (in the state of the tunnel) for filtering the inner data packet may comprise offset information for finding the beginning of the inner data packet and a pointer to rules and/or to a connection state table to which to match the inner data packet. Alternatively, the instructions may comprise instructions to direct the tunneled data packet to another process for handling, the another process filtering the inner data packet.

After the inner data packet has been detected in step 404, it is checked, if the inner data packet is a first data packet of a connection in step 515. If the inner data packet is the first data packet of a connection, the value of at least one field of the inner data packet is matched to a second rule in step 406. Then it is checked, if the connection (or the inner data packet) is allowed according to the action of the second rule in step 507. If the packet is not allowed, it is discarded in step 508. Discarding the inner data packet may mean discarding the whole tunneled data packet or clearing the inner data packet. One reason for the latter choice is that in order not to fail the tunnel, all data packets of the tunnel may be required to be sent. Since one tunnel may include many connections, failing the tunnel may not be acceptable. Clearing selectively some inner data packets enables discarding one or more of the inner connections within the tunnel. If the packet is allowed, an entry corresponding to the connection is created in a second connection state table in step 509 and the action of the second rule is taken in step 408. The first and second connection tables may be separate or included in one connection state table. One reason for using separate tables is that the same addressing information may be used in many different internal networks and therefore some connections may be mixed if all possible entries are included in the same table.

If the inner data packet is not the first data packet of a connection in step 515, the inner header (at least one field of the inner header) is compared to a second connection state table in step 516 for finding, if the connection has been allowed. In step 517, it is checked, if there is an entry matching the inner header in the second connection state table. If there is not, the data packet is discarded in step 508, since the connection is not allowed. If there is an entry matching the outer header in the first connection state table, the connection is allowed, step 518, and the action defined in the matching entry of the second connection state table is taken in step 519.

The action defined in the second rule or entry of the second connection state table to which the inner data packet matches may result for example in allowing the tunneled data packet as such or in modifying the tunneled data packet. Modification of the data packet may involve for example changes in the header fields of the inner data packet due to network address translation (NAT) requirements.

As was already explained above, the second and first connection state tables may be separate tables or included in the same table. The latter may be a desired implementation, if it is allowed that some part of one connection is conveyed within one tunnel and some other part in some other tunnel and possibly still some other part on their own, without a tunnel. Such scenario may be needed for example, if a person using a mobile device (e.g. laptop, PDA, smart phone or mobile phone) moves from one place to another, while having ongoing data connections. In such case, the tunnel, which the data connections are using, may change and, if the person returns to its home network's area, the connections may stop using a tunnel. In some cases, the user may move logically from one side of a firewall to another side of the firewall that may also result in changing the tunnel or stopping/starting to use a tunnel. It is possible that a tunneled data packet does not necessarily contain a complete inner data packet due to different packet sizes in the tunneling protocol and the protocol of the inner connection. Lets assume for example, that TP1 and TP2 are consecutive tunneled data packets of a tunnel and P1, P2 and P3 are consecutive data packets of an inner connection transferred within the tunnel. Now, it is possible, that the tunneled data packet TP1 contains inner data packet P1 and half of the inner data packet P2, and TP2 contains the rest of the inner data packet P2 and the inner data packet P3. That is, the size of the tunneled data packet is larger than the size of the inner data packet.

In such case, the tunneled data packets may be queued for obtaining full inner data packets for filtering. One alternative is to delay TP1 until TP2 is received, and then combine the parts of the inner data packet P2 and filter P2. Then, if the inner data packets are allowed, TP1 and TP2 are released at the same time, TP1 containing the first half of P2 and TP2 the rest of P2. Another possibility is to remove the first half of P2 from TP1 and release TP1 containing only P1. The first half of P2 is stored and filtered with the rest of P2 when TP2 is received. The first half of P2 is then included in TP2 (if possible) and TP2 is released.

Another possibility is that a tunneled data packet TP3 contains only part of an inner data packet P4, and the rest of P4 comes in another tunneled data packet TP4. That is, the size of the tunneled data packet is smaller than the size of the inner data packet. In this case, TP3 may be delayed until TP4 is received for filtering P4 as a whole similarly to the method described above. Another possibility is to record the content of the first part of P4 and release TP3 before receiving TP4. If P4 as a whole then indicates that it should not be allowed, the rest of P4 is not allowed to proceed. In this case the beginning of P4 was allowed even though it should not have been allowed, but this may be regarded acceptable.

One simple practical example of using the method of the invention in connection with GRE (Generic Routing Encapsulation) tunnels is now presented. GRE is a routing protocol, which is used for example for accomplishing routing between different networks. In order to enable the use of routing protocols, which employ multicasting, it is required to allow GRE tunnels through firewalls. (Multicast is communication between one sender and multiple receivers in network.) Since it is possible that GRE tunnels are used as backdoors for some malicious action, it may be desired that not all possible data inside a GRE tunnel be allowed. For this reason, the data inside the GRE tunnels needs to be examined in more detail.

In this case, a rule allowing the tunnel can be for example the following:

| RULE # | SOURCE | DESTINATION | SERVICE | ACTION |
|---|---|---|---|---|
| 1 | Router 1 | Router 2 | GRE | Allow inner data according to rulebase X |

That is the rule would allow GRE tunnels between Router 1 and Router 2 on the condition that the data inside the tunnels are filtered according to a rulebase X. The rulebase X could then be:

| RULE # | SOURCE | DESTINATION | SERVICE | ACTION |
|---|---|---|---|---|
| 1 | Any | Multicast | UDP 234 | Allow |
| 2 | Routers | 244.0.0.4 | OSPF | Allow |
| 3 | Router 1 | Router 2 | Keepalive | Allow |
| 4 | Any | Any | Any | Deny |

Herein, rule #1 allows UDP packets with port 234 from any source to multicast address. Rule #2 allows packets according to OSPF (Open Shortest Path First) protocol from any router to address 244.0.0.4. OSPF is a routing protocol, which is used for multicasting routing information to routers. Rule #3 allows keepalive packets between the routers 1 and 2 and rule #4 denies all other traffic within the tunnel. In this way only legitimate traffic is allowed inside GRE tunnels between Routers 1 and 2, and those packets of the GRE tunnels, which carry something other are denied.

It must be appreciated that the embodiments described above are given as examples only, while the features described in one example may be combined with features of another example and various modifications can be made within the scope and spirit of the invention as defined in the appended claims.

The invention claimed is:

1. A method of filtering a data packet, comprising
providing a first set of filtering rules for filtering tunneled data packets based on outer headers of tunneled data packets only, each tunneled data packet comprising an outer header and an outer payload, the outer payload comprising an inner data packet comprising an inner header and an inner payload,
providing a plurality of second sets of filtering rules for filtering inner data packets of tunneled data packets only, each second set of filtering rules being different from the first set of filtering rules,
receiving at an intermediate device along a tunnel, a tunneled data packet sent from a first end point of the tunnel and destined to a second end point of the tunnel, the received tunneled data packet comprising an outer header and an outer payload provided at said first end point of said tunnel to be removed at said second end point of the tunnel, said intermediate device being located apart from the first and second tunnel end points,
performing a first search, at said intermediate device, only among said first set of filtering rules provided for filtering said received tunneled data packet based on the outer header of said received tunneled data packet, for a first filtering rule containing a value of at least one header field matching to the value of at least one outer header field of said received tunneled data packet,
only in response to finding said matching first filtering rule containing the matching value of at least one header field, taking the action defined in the first matching filtering rule of said first set of filtering rules for filtering an inner data packet without involvement of the first and second end points and without interrupting the tunnel at said intermediate device along the tunnel, the defined action filtering an inner data packet further comprising
detecting the inner data packet within said received tunneled data packet,
selecting among said plurality of said second sets of filtering rules only one second set of filtering rules corresponding to said first matching filtering rule,
performing a second search only among said selected second set of filtering rules for a second filtering rule matching the value of at least one field of the inner data packet and without searching among the other unselected ones of said plurality of said second sets of filtering rules,
taking the action defined in the matching second filtering rule for filtering the detected inner data packet separately from the filtering of the outer header, and
in response to not finding said matching first filtering rule containing the matching value of at least one header field, forwarding said received tunneled data packet from the intermediate device to the second end point of the tunnel without searching any of said plurality of second sets of filtering rules and without filtering the inner data packet.

2. A method according to claim 1, wherein the action defined in the first filtering rule comprises instructions to direct the tunneled data packet to another process for handling, the another process taking the steps of detecting the inner data packet and matching the value of at least one field of the inner data packet to the second filtering rule and taking the action defined in the second filtering rule.

3. A method according to claim 1, wherein the action defined in the first filtering rule comprises offset information for finding the beginning of the inner data packet and a pointer to filtering rules to which to match the inner data packet.

4. A method according to claim 1, further comprising
creating, on the basis of the outer header, to a first connection state table, an entry for processing other data packets of the same tunnel, the entry comprising a value of at least one outer header field for identifying the other data packets of the same tunnel and instructions for filtering the inner data packet, and
creating, on the basis of the inner header, to a second connection state table, an entry for processing other data packets of the same connection, the entry comprising a value of at least one inner header field for identifying the other data packets of the same connection and instructions for processing the inner data packet.

5. A method according to claim 4, wherein the entries of the first and the second connection state table are included in one connection state table.

6. A method according to claim 4, wherein the instructions for filtering the inner data packet comprise offset information for finding the beginning of the inner data packet and a pointer to filtering rules and/or to a connection state table to which to match the inner data packet.

7. A method according to claim 4, wherein the instructions for filtering the inner data packet comprise instructions to direct the tunneled data packet to another process for handling, the another process filtering the inner data packet.

8. A method according to claim 1, wherein taking the action defined in the second filtering rule comprises modifying at least one field of the inner data packet.

9. A method according to claim 1, wherein the data packet is an Internet Protocol version 6 data packet and the inner header is an Extension Header field of Internet Protocol version 6.

10. A network gateway configured to be connected to an intermediate point of a tunnel formed by tunneled data packets sent from a first end point of the tunnel and destined to a second end point of the tunnel, for filtering the tunneled data packet without involvement of the first and second end points and without interrupting the tunnel at said network gateway along the tunnel, said intermediate point being located apart from the first and second tunnel end points, the network gateway comprising
a mechanism for providing a first set of filtering rules for filtering tunneled data packets based on outer headers of tunneled data packets only, each tunneled data packet comprising an outer header and an outer payload, the outer payload comprising an inner data packet comprising an inner header and an inner payload,
a mechanism for providing a plurality of second sets of filtering rules for filtering inner data packets of tunneled data packets only, each second set of filtering rules being different from the first set of filtering rules,
a mechanism for intercepting a tunneled data packet sent from said first end point of the tunnel and destined to said second end point of the tunnel, the received tunneled data packeting comprising an outer header and an outer payload provided at said first end point of said tunnel to be removed at said second end point of the tunnel,
a mechanism for performing a first search among said first set of filtering rules for a first filtering rule containing a value of at least one header field matching to the value of at least one outer header field of the received tunneled data packet, and
a mechanism, responsive only to finding said matching first filtering rule, for taking the action defined in the first matching filtering rule of said first set of filtering rules for filtering an inner data packet without involvement of the first and second end points and without interrupting the tunnel at said network gateway along the tunnel, said mechanism taking the defined action for filtering an inner data packet further comprising
- a mechanism for detecting the inner data packet within the tunneled data packet,
- a mechanism for selecting among said plurality of said second sets of filtering rules only one second set of filtering rules corresponding to said first matching filtering rule and without searching among the other unselected ones of said plurality of said second sets of filtering rules,
- a mechanism for performing a second search among said selected second set of filtering rules for a second filtering rule matching the value of at least one field of the inner data packet,
- a mechanism for taking the action defined in the matching second filtering rule for filtering the detected inner data packet separately from the filtering of the outer header, and
- a mechanism responsive to not finding said matching first filtering rule containing the matching value of at least one header field for forwarding the tunneled data packet from the intermediate device to the second end point of the tunnel without searching any of said plurality of second sets of filtering rules and without filtering the inner data packet.

11. An apparatus, comprising a computer-readable storage that contains a computer software which, when executed in a computer device, causes the computer device to provide a routine of filtering a data packet comprising
- providing a first set of filtering rules for filtering tunneled data packets based on outer headers of tunneled data packets only, each tunneled data packet comprising an outer header and an outer payload, the outer payload comprising an inner data packet comprising an inner header and an inner payload,
- providing a plurality of second sets of filtering rules for filtering inner data packets of tunneled data packets only, each second set of filtering rules being different from the first set of filtering rules,
- receiving a tunneled data packet at an intermediate device along a tunnel, a tunneled data packet sent from a first end point of the tunnel and destined to a second end point of said tunnel, said intermediate point being located apart from the first and second tunnel end points, the received tunneled data packet comprising an outer header and an outer payload provided at said first end point of said tunnel to be removed at said second end point of the tunnel,
- performing a first search, at said intermediate device, only among said first set of filtering rules for a first filtering rule containing the matching value of at least one header field matching the value of at least one outer header field of the received tunneled data packet, and
- only in response to finding said matching first filtering rule containing the matching value of at least one header field, taking the action defined in the first matching filtering rule of said first set of filtering rules for filtering an inner data packet transparently to the first and second end points and without breaking the tunnel, said defined action for filtering an inner data packet comprising
  - detecting the inner data packet within the received tunneled data packet,
  - selecting among said plurality of said second sets of filtering rules only one second set of filtering rules corresponding to said first matching filtering rule,
  - performing a further second search only among said selected second set of filtering rules for a second filtering rule matching to the value of at least one field of the inner data packet and without searching among the other unselected ones of said plurality of said second sets of filtering rules,
  - taking the action defined in the matching second filtering rule for filtering the detected inner data packet separately from the filtering of the outer header, and
  - in response to not finding said matching first filtering rule containing the matching value of at least one header field, forwarding said receiving tunneled data packet from the intermediate point to the second end point of the tunnel without searching any of said plurality of second sets of filtering rules and without filtering the inner data packet.

12. A method of filtering a data packet, comprising
- providing a first set of filtering rules for filtering tunneled data packets based on outer headers of tunneled data packets only, each tunneled data packet comprising an outer header and an outer payload, the outer payload comprising an inner data packet comprising an inner header and an inner payload,
- providing a plurality of second sets of filtering rules for filtering inner data packets of tunneled data packets only, each second set of filtering rules being different from the first set of filtering rules,
- receiving, at an intermediate device along said tunnel, a tunneled data packet sent from said first end point of the tunnel and destined to said second end point of the tunnel, the received tunneled data packet comprising an outer header and an outer payload provided at said first end point of said tunnel to be removed at said second end point of the tunnel, said intermediate device being located apart from the first and second tunnel end points,
- if the received tunneled data packet is a first packet of said tunnel, performing, at said intermediate device, among said first set of filtering rules, only a first search for a first filtering rule containing a value of at least one header field matching to the value of at least one outer header field of the received tunneled data packet, and
- a) in response to not finding any matching filtering rule in said first search performed only among the first set of filtering rules, rejecting the tunnel as not allowed and discarding the received tunneled data packet,
- b) only in response to finding said matching first filtering rule in said first search performed only among the first set of filtering rules,
  - allowing the tunnel and creating, on the basis of the outer header, to a first connection state table, an entry for processing other data packets of the same tunnel, the entry comprising a value of at least one outer header field for identifying the other data packets of the same tunnel and instructions for filtering the inner data packet,
  - detecting the inner data packet within said received tunneled data packet,
  - if the inner data packet is a first packet of a connection within the tunnel, selecting among said plurality of said second sets of filtering rules only one second set of filtering rules corresponding to said first matching rule,
  - performing a second search, without involvement of the first and second end points and without interrupting the tunnel at said intermediate device along the tunnel, only among said selected second set of filtering rules for a second filtering rule matching the value of at least one field of the inner data packet and without searching among the other unselected ones of said plurality of said second sets of filtering rules, in response to not finding any matching filtering rule in the selected second set of filtering rules, rejecting the connection as not allowed and discarding the tunneled data packet, in response to finding a matching second filtering rule in said second search performed only among the selected second set of filtering rules, allowing the connection and creating, on the basis of the inner header, to a second connection state table, an entry for processing other data packets of the same connection, the entry comprising a value of at least one inner header field for identifying the other data packets of the same connection and instructions for processing the inner data packet, and taking the action defined in the matching second filtering rule for filtering the detected inner data packet separately from the filtering of the outer header, and forwarding, from the intermediate device to the second end point of the tunnel, those of the tunneled data packets that have passed the filtering.

13. A method according to claim 12, comprising
receiving a further tunneled data packet of said tunnel,
comparing at least one outer header field of the further tunneled data packet with said first connection state table,
in response to not finding any matching entry in said first connection state table, discarding said further tunneled data packet,
in response to finding a matching entry in said first connection state table, allowing the tunnel and detecting the inner data packet within the tunneled data packet,
  if the inner data packet is not a first packet of a connection within the tunnel, comparing the inner data packet with said second connection state table,
  in response to not finding any matching entry in said second connection state table, discarding the tunneled data packet,
  in response to finding a matching entry in said second connection state table, allowing the connection and taking the action defined in the matching entry of said second connection state table.

14. An apparatus, comprising a computer-readable storage, containing a computer software which, when executed in a computer device, causes the computer device to provide a routine of filtering a data packet comprising
providing, at an intermediate point along a tunnel, a first set of filtering rules for filtering tunneled data packets based on outer headers of tunneled data packets only, each tunneled data packet comprising an outer header and an outer payload, the outer payload comprising an inner data packet comprising an inner header and an inner payload, said intermediate point being located apart from the first and second tunnel end points,
providing, at said intermediate point, a plurality of second sets of filtering rules for filtering inner data packets of tunneled data packets only, each second set of filtering rules being different from the first set of filtering rules,
receiving, at said intermediate point, a tunneled data packet sent from said first end point of the tunnel and destined to said second end point of the tunnel, the received tunneled data packet comprising an outer header and an outer payload provided at said first end point of said tunnel to be removed at said second end point of the tunnel, if the received tunneled data packet is a first packet of a tunnel, performing, at said intermediate point, among said first set of filtering rules only, a first search for a first filtering rule containing a value of at least one header field matching to the value of at least one outer header field of the received tunneled data packet, and a) in response to not finding any matching first filtering rule in said first search performed only among the first set of filtering rules containing the matching value of at least one header field, rejecting, at said intermediate point, the tunnel as not allowed and discarding the tunneled data packet, b) in response to finding said matching first filtering rule in said first search performed only among the first set of filtering rules,
  allowing, at said intermediate point, the tunnel and creating, on the basis of the outer header, to a first connection state table, an entry for processing other data packets of the same tunnel, the entry comprising a value of at least one outer header field for identifying the other data packets of the same tunnel and instructions for filtering the inner data packet,
  detecting, at said intermediate point, the inner data packet within the received tunneled data packet,
  if the inner data packet is a first packet of a connection within the tunnel, selecting among said plurality of said second sets of filtering rules only one second set of filtering rules corresponding to said first matching filtering rule,
  performing, at said intermediate point, among said selected second set of filtering rules only, a second search for a second filtering rule matching the value of at least one field of the inner data packet transparently to the first and second end points and without breaking the tunnel,
  in response to not finding any matching filtering rule in said second search performed only among the selected second set of filtering rules, rejecting, at said intermediate point, the connection as not allowed and discarding the received tunneled data packet,
  in response to finding a matching second filtering rule in said second search performed only among the selected second set of filtering rules, allowing, at said intermediate point, the connection and creating, on the basis of the inner header, to a second connection state table, an entry for processing other data packets of the same connection, the entry comprising a value of at least one inner header field for identifying the other data packets of the same connection and instructions for processing the inner data packet, and taking the action defined in the matching second filtering rule for filtering the detected inner data packet separately from the filtering of the outer header,
  forwarding, from the intermediate point to the second end point of the tunnel, those of the tunneled data packets that have passed the filtering.

15. An apparatus according to claim 14, wherein the computer software, when executed in a computer device, causes the computer device to provide further routines for
receiving a further tunneled data packet of said tunnel,
comparing at least one outer header field of the further tunneled data packet with said first connection state table,
in response to not finding any matching entry in said first connection state table, discarding said further tunneled data packet, in response to finding a matching entry in said first connection state table, allowing the tunnel and detecting the inner data packet within the tunneled data packet, if the inner data packet is not a first packet of a connection within the tunnel, comparing the inner data packet with said second connection state table, in response to not finding any matching entry in said second connection state table, discarding the tunneled data packet, in response to finding a matching entry in said second connection state table, allowing the connection and taking the action defined in the matching entry of said second connection state table.

16. A network gateway comprising a firewall connectable between a gateway packet radio support node and a packet radio support node for filtering tunneled data packets sent the gateway packet radio support node and destined to the packet radio support node, or vice versa, over a tunnel having one end point at the gateway packet radio support node and another end point at the packet radio support node without involvement of the gateway packet radio support node and without interrupting said tunnel at said firewall, said firewall being located apart from the packet radio support node and the gateway packet radio support node, the firewall having a first set of filtering rules for filtering tunneled data packets based on outer headers of tunneled data packets only, each tunneled data packet comprising an outer header and an outer payload, the outer payload comprising an inner data packet comprising an inner header and an inner payload, the firewall having a plurality of second sets of filtering rules for filtering inner data packets of tunneled data packets only, each second set of filtering rules being different from the first set of filtering rules, the firewall being configured to intercept a tunneled data packet sent from the gateway packet radio support node and destined to the packet radio support node, or vice versa, the intercepted tunneled data packet being provided at one of the end points of said tunnel to be removed at another one of said end points of the tunnel, the firewall being configured to perform only among said first set of filtering rules, a first search for a first filtering rule matching to the value of at least one outer header field of the intercepted tunneled data packet, and the firewall being configured to, only in response to finding said matching first filtering rule in said first search performed only among the first set of filtering rules, take the action defined in the first matching filtering rule of said first set of filtering rules for filtering an inner data packet without involvement of the gateway packet radio support node and the packet radio support node and without interrupting the tunnel at said firewall, the firewall being configured to take the defined action for filtering an inner data packet by detecting the inner data packet within the tunneled data packet, selecting among said plurality of said second sets of filtering rules only one second set of filtering rules corresponding to said first matching filtering rule found in said first search performed only among the first set of filtering rules, performing, among said selected second set of filtering rules only, a second search for a second filtering rule matching the value of at least one field of the inner data packet, taking the action defined in the matching second filtering rule found in said first search performed only among the first set of filtering rules for filtering the detected inner data packet separately from the filtering of the outer header, the firewall being configured to forward, from the packet radio support node to the gateway packet radio support node, or vice versa, those of the tunneled data packets that have passed the filtering.

* * * * *